「United States Patent」 [19]

(12) United States Patent
Oldham et al.

(10) Patent No.: US 7,766,231 B2
(45) Date of Patent: Aug. 3, 2010

(54) DEVICES AND METHODS FOR DETERMINING THE AMOUNT OF INDIVIDUAL USAGE OF A SHARED COMMODITY

(75) Inventors: Robert Gregory Oldham, Raleigh, NC (US); Roy Stephen Colby, Raleigh, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 415 days.

(21) Appl. No.: 11/166,820

(22) Filed: Jun. 24, 2005

(65) Prior Publication Data

US 2006/0289623 A1 Dec. 28, 2006

(51) Int. Cl.
*G06K 19/00* (2006.01)
*G06K 17/00* (2006.01)
(52) U.S. Cl. ........................ 235/385; 235/375
(58) Field of Classification Search ............ 235/375, 235/385, 384; 705/40, 10
See application file for complete search history.

(56) References Cited

U.S. PATENT DOCUMENTS

| 5,229,713 | A | * | 7/1993 | Bullock et al. | 324/142 |
| 6,122,603 | A | * | 9/2000 | Budike, Jr. | 702/182 |
| 6,862,540 | B1 | * | 3/2005 | Welch et al. | 702/44 |
| 2002/0069163 | A1 | * | 6/2002 | Gilbert | 705/40 |
| 2003/0034900 | A1 | * | 2/2003 | Han | 340/870.02 |
| 2003/0171903 | A1 | * | 9/2003 | Rutherford et al. | 703/9 |
| 2003/0199685 | A1 | * | 10/2003 | Pressman et al. | 536/24.3 |
| 2004/0098376 | A1 | * | 5/2004 | Li et al. | 707/3 |
| 2004/0119608 | A1 | * | 6/2004 | Rao et al. | 340/870.01 |
| 2004/0259523 | A1 | * | 12/2004 | Stenger | 455/405 |
| 2005/0055432 | A1 | * | 3/2005 | Rodgers | 709/223 |
| 2006/0036967 | A1 | * | 2/2006 | Crichlow | 715/781 |
| 2006/0160065 | A1 | * | 7/2006 | Timmis et al. | 435/4 |
| 2007/0043478 | A1 | * | 2/2007 | Ehlers et al. | 700/276 |
| 2007/0216918 | A1 | * | 9/2007 | Honeck et al. | 358/1.9 |

* cited by examiner

*Primary Examiner*—Thien Minh Le
*Assistant Examiner*—Tuyen K Vo

(57) ABSTRACT

Devices and methods of commodity usage monitoring determine the amount of commodity used by individual elements of multi-element systems having a common source. An amount of commodity drawn from the source by all the users is determined. A user-state that indicates use of the commodity by each user is determined. Individual user consumption of the commodity for each of the users is determined using repeated determinations of the amount of the commodity and the user-state, for a number of repetitions greater than or equal to the number of users. Determining individual consumption can be performed using minimum least square estimation, singular value decomposition, discriminant function analysis, or other computational or analytical solution method. Duration and consumption information can be used to calculate the total amount of the commodity consumed by the particular user. Useful commodities include, but are not limited to, gas, electricity, mechanical, pneumatic, hydraulic, and water.

23 Claims, 3 Drawing Sheets

DEVICES AND METHODS FOR DETERMINING THE AMOUNT OF INDIVIDUAL USAGE OF A SHARED COMMODITY

FIELD OF THE INVENTION

The present invention relates, in general, to commodity usage monitoring and, more particularly, to devices and methods of determining the amount of a commodity used by an individual element of a multi element system having a shared commodity source.

BACKGROUND OF THE INVENTION

Commodities, such as gas, water, electricity, or other forms of power, energy, or desirable commodity are delivered from a supplier to consumers. The costs associated with acquiring, generating, developing and/or delivering the commodity is borne by the consumer, often by paying for the volume or amount of the commodity. For example, if natural gas is delivered to a business or household through a pipe system using metering at the consumer's location, a gas meter measures the flow-rate of the gas entering the business or household. The flow-rate determines the amount of the commodity consumed over a given time period, and the consumer is billed regularly to pay for the commodity.

Historically, gas meters were equipped with a readout dial to enable a utility employee to record gas usage for billing purposes. In order read the meter, the employee would have to look directly at the meter to read the dial. This process would be repeated at each home or business, a time-consuming task. The meters require resources to manufacture and/or install, and need to be repaired or replaced after failure.

In recent years, encoder receiver transmitters have been developed to transmit a signal related to the gas usage to a remote receiver. The utility employee simply drives past the building in a vehicle and receive the transmitted usage data without ever leaving the vehicle. U.S. Pat. No. 5,673,252 to Johnson et al., hereby incorporated herein by reference, describes a communications protocol for transmitting usage data from a gas meter. Meters that are read from a distance are more complex and expensive than simple flow meters, and require data transmission capabilities and other components that also require repair and maintenance.

For reasons stated above, and for other reasons which will become apparent to those skilled in the art upon reading the present specification, there is a need for systems and methods that provide for the determination and monitoring of a commodity delivered from a common source to multiple consumers. There is a particular need for determining consumption of a commodity while reducing the costs and complexity of metering of the commodity. The present invention fulfills these and other needs, and addresses deficiencies in known systems and techniques.

SUMMARY OF THE INVENTION

The present invention is directed to devices and methods of commodity usage monitoring, such as for determining the amount of a commodity used by an individual element, defined herein as a commodity-user or simply a user, of a multi-user system having a shared commodity source passing through a single metering device. According to one embodiment, a method for tracking individual user consumption of a commodity delivered from a common source to two or more users involves determining an amount of a commodity drawn from a source, and determining an ON or OFF state of the user defined herein as a commodity-user-state or simply a user-state, that indicates use of the commodity by each of at least two users. Individual user consumption of the commodity for each of the users is determined as a function of repeated determinations of the amount of the commodity drawn from the source and the user-state, for a number of repetitions greater than or equal to the number of users.

In another embodiment, a measurement is made of the time-period during which a particular user draws from the source, which is determined from the user-state, and designated as a duration. The duration and amount information are used to calculate the total amount of the commodity consumed by the particular user. A meter or other measuring device measures an amount of the commodity drawn from the common source. Typically, a processor is coupled to the meter and configured to determine an individual user consumption of the commodity for each user as a function of repeated determinations of the amount of the commodity drawn from the source and the user-state, for a number of repetitions greater than or equal to the number of users. In a more particular embodiment, the processor is further configured to solve a set of equations developed using meter and user state information to determine the rate of consumption of the commodity for each of the plurality of users.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The novel features of the invention are set forth with particularity in the appended claims. The invention itself, however, both as to organization and methods of operation, together with further objects and advantages thereof, are best understood by reference to the following description, taken in conjunction with the accompanying drawings in which:

Figure 1:
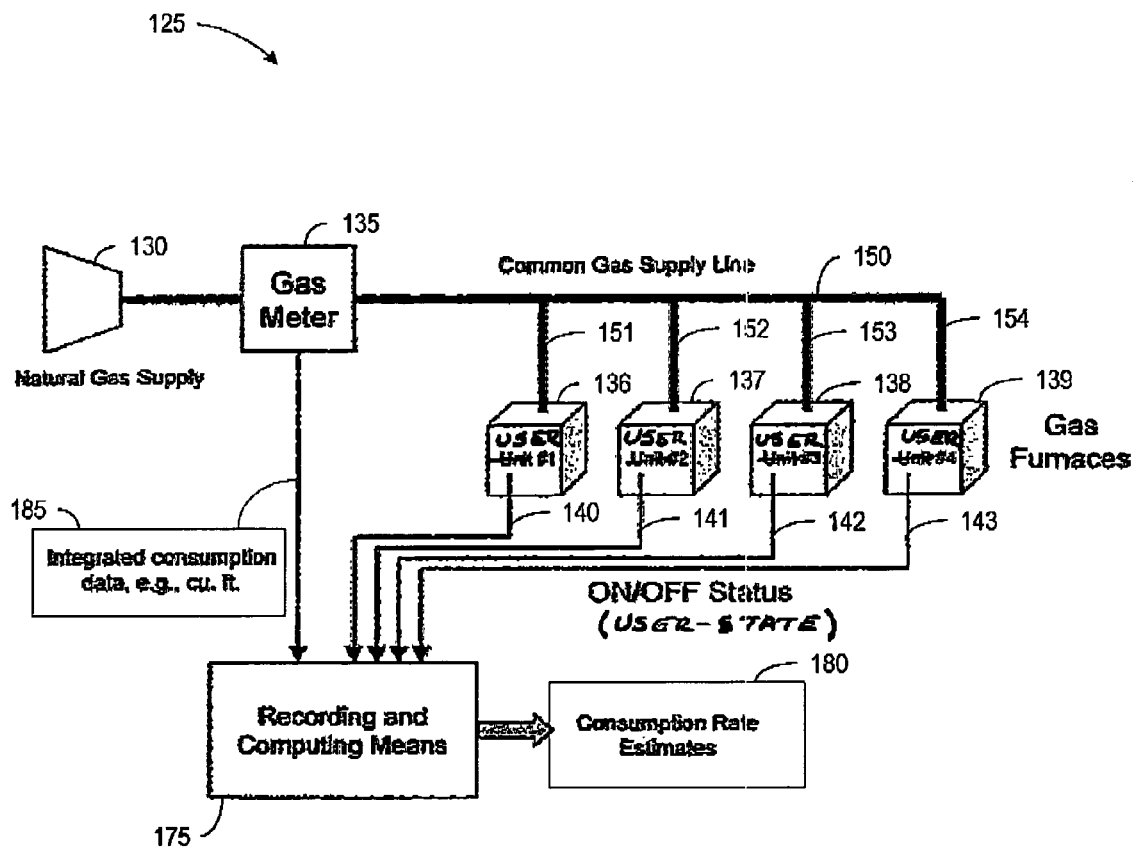
FIG. 1 is a block diagram of a system for determining the amount of commodity delivered to multiple users in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE INVENTION

The present invention relates, in general, to commodity usage monitoring and, more particularly, to devices and methods of determining the amount of a commodity used by an individual user of a multi-user system having a shared commodity source.

Methods and devices employing commodity usage determination in accordance with the present invention incorporate one or more of the features, structures, methods, or combinations thereof described herein below. For example, a system for determining consumption of a commodity, such as the volume of natural gas delivered to a furnace, can be implemented to include one or more of the features and/or processes described below. It is intended that such a device or method need not include all of the features and functions described herein, but can be implemented to include one or more features and functions that, alone or in combination, provide for unique structures and/or functionality.

A commodity, such as natural gas, is supplied to multiple consuming devices, such as gas furnaces, via a common supply. It is desirable to determine the rate of consumption of the commodity for each of the consuming devices over a defined period of time, and to determine the total amount of the commodity consumed by each device during that same period. It is further desirable to arrive at these determinations without instrumenting the individual consuming units with consumption rate meters (e.g., gas flow meters in the case of gas furnaces).

Systems and methods in accordance with the present invention determine the individual usage of a commodity having a single source to multiple users without requiring a meter for each user, thereby reducing cost and complexity of the commodity distribution system. Although gas delivery, such as natural gas delivered from a supplier to consumers, is used as an example herein, the present invention is not necessarily limited to gas supply. Some examples of commodities that benefit from determining the individual usage of a commodity from a single source to multiple users without requiring a meter for each user include: natural gas, oil, gasoline, water, propane, hydrogen, electricity, sewer, hydraulic energy, pneumatic energy, mechanical energy, or other useful commodity. The term "gas" is not intended to be limited to natural gas, but includes any matter in its gaseous state such as, for example, hydrogen, oxygen, nitrous oxide, natural gas, propane, or other gas.

The term "water" is not intended to be limited to fresh potable water, but is intended to include fresh water, filtered water, waste water, other forms of potable or non-potable water, and slurries and/or mixtures with water. Delivery of water is intended to include delivery of water from a common source, as well as delivery of the collection of wastewater or other used water into a common source, such as a sewer service, for example. In embodiments of the present invention related to the collection of a waste material as the commodity, the term "drawn" also describes drawing down the capacity of a common collection source, for example.

The example illustrated in FIG. 1 describes the determination of natural gas consumption by a group of gas furnaces. Although furnaces are illustrated, one or more other types of appliances can be used in addition to, or instead of, furnaces. For example, ovens, water heaters, or other gas consuming appliances can be mixed, and their usage determined, in accordance with the present invention.

In FIG. 1, a system 125 in accordance with the present invention includes a common natural gas supply 130 that provides natural gas through a common gas supply line 150 to a number of users 136, 137, 138, and 139 through supply lines 151, 152, 153, and 154 respectively. The users illustrated in FIG. 1 are indicated as gas furnaces. Each of the users 136, 137, 138, and 139 provides an indicator signal 140, 141, 142, and 143 respectively to a microprocessor 175. The common natural gas supply 130 is metered by a gas meter 135 that provides integrated consumption data 185 to the microprocessor 175. The integrated consumption data 185 provides information to the microprocessor 175 relative to the total amount of the commodity, in this case gas, that is drawn from the common natural gas supply 130. The microprocessor 175 uses the integrated consumption data 185 and the information provided by the indicator signal 140, 141, 142, and 143 to determine individual user consumption of the commodity, illustrated as consumption rate estimates 180 in FIG. 1. The microprocessor 175 includes a memory (not shown). The memory stores the consumption data 185 associated with the amount drawn from the source, and stores individual user-state data for a series of repetitions. The processor then develops a set of equations from the stored data, which are solved to determine individual usage in accordance with the present invention.

Figure 2:
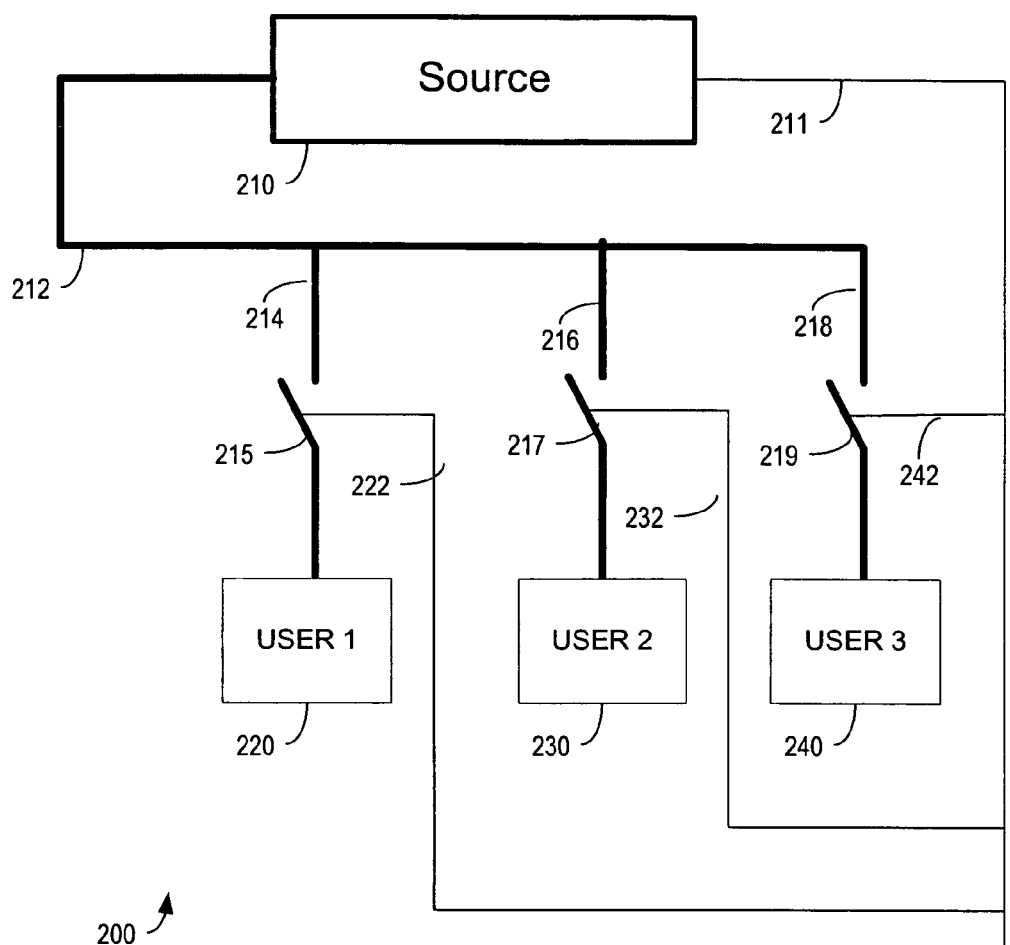
FIG. 2 is a block diagram of a commodity distribution system in accordance with embodiments of the present invention.
Figure 2:
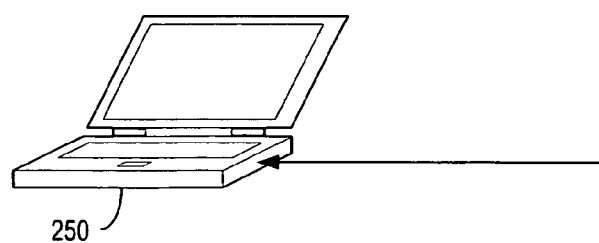

The example illustrated in FIG. 2 describes a system 200 for the determination of consumption of a commodity from a source 210 by a group of users 220, 230, and 240. Although only three users are illustrated, any number of users can be added to the system 200 without departing from the scope of the present invention. The source 210 can be any source described above, including a collection source, for example. Examples of meters used to measure the commodity delivered include, for example, a gas meter to determine the total cubic feet of gas delivered, a watt-hour meter to determine the total electrical energy delivered, a water meter to determine the total gallons of water delivered, or other meter useful for commodity measurement.

In FIG. 2, the system 200 provides its commodity through a common conduit 212 to the users 220, 230, and 240, using supply lines 214, 216, and 218 respectively. Each of the users 220, 230, and 240 provides an indication 222, 232, and 242 respectively to a computation device 250, here illustrated as a laptop computer. The indications 222, 232, and 242 illustrated in FIG. 2 correspond to a switch 215, 217, and 219 respectively. The switches 215, 217, and 219 are, in one example, relays that switch electric power to the users 220, 230, and 240 where the source 210 is an electric source. The switches 215, 217, and 219 are, in another example, sensors that sense flow in a sewer from the users 220, 230, and 240 in an example where the source 210 is a waste water collection facility.

The common source 210, using a meter as described above, for example, provides a measure 211 to the computation device 250 of the total amount drawn from the source 210. The computation device 250 collects information, at desired intervals, regarding the user-states of the switches 215, 217, and 219, and the amount of the commodity at the source 210. This information is collected and stored in the memory of the computation device 250 (not shown) to create a set of data which the computation device 250 uses to determine individual consumption of the commodity by each of the users 220, 230, and 240 as will be described below.

Figure 3:
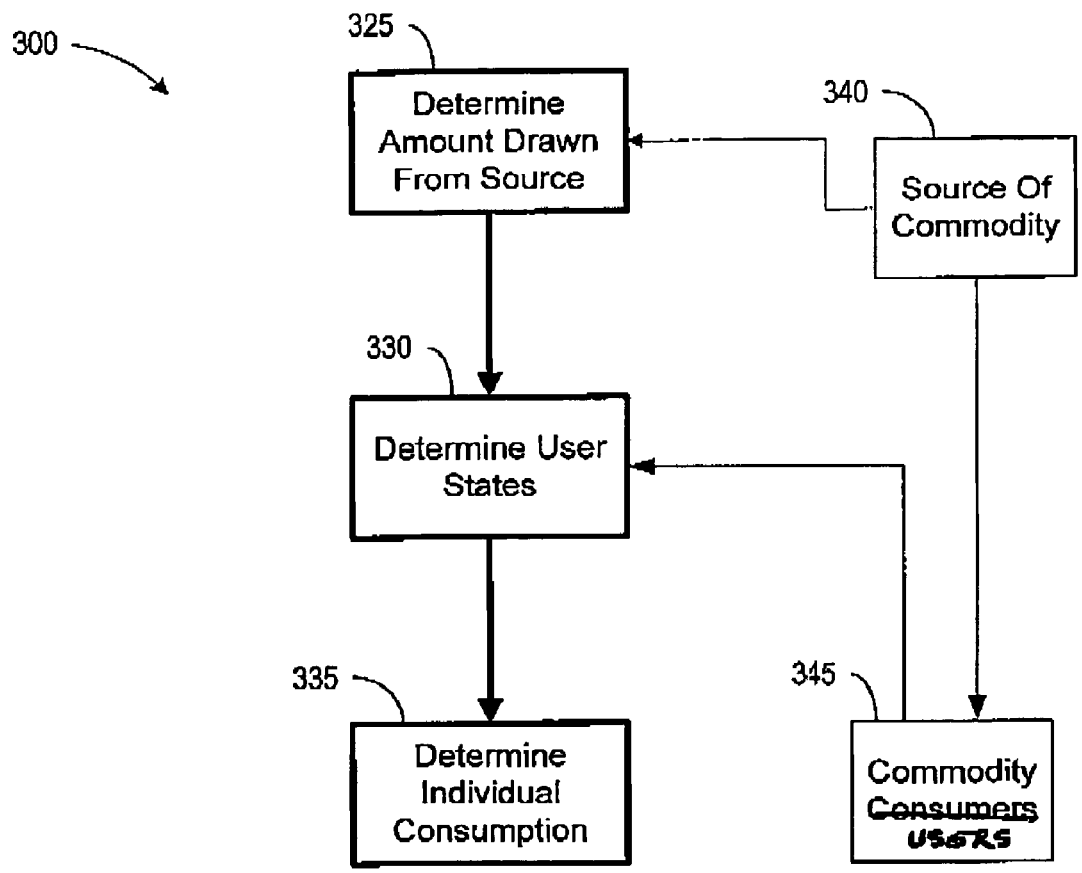
FIG. 3 is a flow chart of a method of determining consumption of a commodity in accordance with embodiments of the present invention.

FIG. 3 illustrates a method 300 for determining individual user consumption of a commodity delivered from a common source to two or more users in accordance with the present invention. A commodity source 340 delivers a commodity to users 345 as described above. A determination 325 is made of the amount of the commodity drawn from the source 340. Examples of determinations 325 include: a gas meter that provides a flow rate; an ammeter that provides current flow; and a scale that provides weight information.

The commodity users 345 provide user-state information used to determine 330 user-states of the commodity users 345. For example, determination 330 of user states can be binary ON/OFF states of a switch for each of the commodity users 345 that indicate whether or not each of the commodity users 345 is consuming the commodity from the source 340.

A determination 335 of individual user consumption of the commodity for each of the commodity users 345 is made, as a function of repeated determinations 325 of the amount of the commodity drawn from the source and determinations 330 of the user-state, for a number of repetitions greater than or equal to the number of commodity users 345. Repeating the determinations 325 and 330 a number of times greater than the number of commodity users 345 enables a set of equations to be developed, which can be solved to determine the individual consumption as described below. The equations include commodity rate and/or amount information and user-state information, which can be formed into a set of coupled equations. The set of equations can be solved to determine individual rate of usage and/or amount of usage of the commodity when the number of equations is greater than or equal to the number of users. Several methodologies are useful for solving this set of equations, including minimum least square estimates, singular value decomposition, discriminant function analysis, linear regression, canonical correlation and other numerical and analytical methods of solution of the set of equations. A minimum least square estimate example of the solution of these equations is provided below as an example of one method for tracking individual user consumption determination.

Mathematical development of an example of a method of determining the rate of usage of a commodity by individual users in accordance with the present invention is provided as follows. Assume there are four commodity users that are drawing a commodity from a common source, and providing user-state signals written as:

$$s_1 = [0110] \quad \text{(Eq. 1)}$$

indicating, in this example at time 1, whether or not they are drawing from the source, where a user-state of 1 indicates the user is drawing the commodity, and a user-state of 0 indicates the user is not drawing the commodity. These signals can be recorded simultaneously, along with the amount $q_1$ of the source being consumed during time interval $d_1$ (defined below).

Define the (currently unknown) individual consumption rate of user 1 as $r_1$, individual consumption rate of user 2 as $r_2$, individual consumption rate of user 3 as $r_3$, and individual consumption rate of user 4 as $r_4$. The total commodity delivered during a time interval $d_1$ can be expressed in terms of the duration of the interval and the average consumption rate (rate definable, for example, as the time rate of consumption, $q_i/d_i$) of each user consuming the commodity during that interval as:

$$d_1 \cdot [0110] \cdot \begin{pmatrix} r_1 \\ r_2 \\ r_3 \\ r_4 \end{pmatrix} = q_1 \quad \text{(Eq. 2)}$$

where user 1 and user 4 are not consuming during the duration, and users 2 and 3 are consuming during the duration. During a second time interval of duration $d_2$, users 1, 2, and 3 can be consuming, and user 4 not consuming, which can be expressed as:

$$d_2 \cdot [1110] \cdot \begin{pmatrix} r_1 \\ r_2 \\ r_3 \\ r_4 \end{pmatrix} = q_2 \quad \text{(Eq. 3)}$$

These equations can be combined into standard (standard matrix notation is used throughout this document) matrix form as:

$$\begin{pmatrix} d_1 & 0 \\ 0 & d_2 \end{pmatrix} \cdot \begin{pmatrix} 0110 \\ 1110 \end{pmatrix} \cdot \begin{pmatrix} r_1 \\ r_2 \\ r_3 \\ r_4 \end{pmatrix} = \begin{pmatrix} q_1 \\ q_2 \end{pmatrix} \quad \text{(Eq. 4)}$$

The objective is to determine the individual commodity consumption rate, $r_j$ from the recorded signals $s_i$ and $q_i$, which, as disclosed above, can be performed using a number of different techniques. One example, a minimum squares method, is described below.

Denote the number of commodity consuming users as m. For notational simplicity define the state duration vector $D_i$ for interval i as a 1 by m row vector, formed as the product of the scalar duration $d_i$ and the state vector $s_i$:

$$D_i = d_i \, s_i \text{ (e.g. } D_i = [0 \; d_1 \; d_1 \; 0] \text{ in the above example).} \quad \text{(Eq. 5)}$$

Define the vector of average consumption rates as:

$$R = \begin{pmatrix} r_1 \\ r_2 \\ r_3 \\ \vdots \\ r_m \end{pmatrix} \quad \text{(Eq. 6)}$$

The vector of consumption subtotals after the ith time interval is defined as:

$$Q = \begin{pmatrix} q_1 \\ q_2 \\ q_3 \\ \vdots \\ q_i \end{pmatrix} \quad \text{(Eq. 7)}$$

Further define the matrix X as the matrix of row vectors $D_i$:

$$X = \begin{pmatrix} D_1 \\ D_2 \\ D_3 \\ \vdots \\ D_i \end{pmatrix} \quad \text{(Eq. 8)}$$

Now the system of equations can be re-cast as:

$$X \cdot R = Q \quad \text{(Eq. 9)}$$

Assuming X to be of full column rank, a minimum least-squares estimator can be made of the consumption rate vector R, by pre-multiplying both sides of $X \cdot R = Q$ by the left inverse of matrix X. The left inverse (for full column rank X) can be formed by pre-multiplying (multiply from the left) X by its transpose (X'), and then inverting the resulting m by m square matrix, and then multiply this (inverted) result on the right by X' to obtain the estimator for consumption rates, denoted $$\hat{R} = (X'X)^{-1} \cdot X' \cdot Q \quad \text{(Eq. 10)}$$

In the case where X is not full column rank because some columns are entirely zero, then the pseudoinverse of X is used. The pseudoinverse solution can be obtained from equation (10) be making a new matrix, W, from X by removing all zero columns from X, and the corresponding rows from R, and then solving (10) as:

$$\hat{R} = (W'W)^{-1} \cdot W' \cdot Q \quad \text{(Eq. 10.5)}$$

For example, if m=4, and the $4^{th}$ user never consumes the commodity during the sample period, then the $4^{th}$ column of X is zero. Form W as the $1^{st}$ three columns of X, and R as the $1^{st}$ three rows of R. Then the $4^{th}$ row of R, ($r_4$), is automatically zero, and the other values of R are given by (10.5). For this situation where one or more of the columns of X are zero, singular value decomposition will give the solution (10.5). The method of removing the "zero" columns of X and corresponding rows of R is much simpler than computing the singular value decomposition of X, and yields the same result.

There may exist a constant load on the commodity supply, such as the consumption of gas by all the pilot lights, for example. In this case we can postulate a consuming users #0 that is always on. The vector of consumption becomes:

$$R = \begin{pmatrix} r_0 \\ r_1 \\ r_2 \\ \vdots \\ r_m \end{pmatrix} \quad \text{(Eq. 11)}$$

and the first (or $zero^{th}$) element in each state vector $s_i$ is one. The constant consumption rate $r_0$ will be estimated along with the rates for the individual users as described above.

Estimation of the individual consumption rates for multiple users drawing from a common commodity source, as described above, can be performed by execution the pseudo-code in Table 1.

Note that the code in Table 1 requires storage for the vectors $D_i$ and the incremental consumption totals $q_i$. Another example of a solution algorithm builds the matrices (X'X) and (X'Q) incrementally at each step. Storage for the a-priori indeterminable number of vectors $D_i$ and the incremental consumption totals $q_i$ is not required.

The matrix (X'X) can be expressed as:

$$X' \cdot X = [D'_1 \cdot D'_2 \ldots D'_i] \cdot \begin{bmatrix} D_1 \\ D_2 \\ \vdots \\ D_i \end{bmatrix} = D'_1 \cdot D_1 + D'_2 \cdot D_2 + \ldots + D'_i \cdot D_i \quad \text{(Eq. 12)}$$

$$X' \cdot Q = [D'_1 \cdot D'_2 \ldots D'_i] \cdot \begin{bmatrix} q_1 \\ q_2 \\ \vdots \\ q_i \end{bmatrix} = D'_1 \cdot q_1 + D'_2 \cdot q_2 + \ldots + D'_i \cdot q_i \quad \text{(Eq. 13)}$$

Hence the update procedure for the matrices is to compute the last terms in equation 12 and equation 13 and add them to the previous totals. A pseudo-code of this algorithm is provided in Table 2.

One advantage of using equation (12) is that storage or memory for at most $m^2$ (since X'X is symmetric, only m(m+1)/2 numbers are unique) numbers is needed regardless of how long the sample period, or how many state changes have occurred during the sample period. Similarly equation (13) requires storage for only m numbers. A tradeoff when using Equation 13 versus Equation 10 is that the estimator is biased if the $r_i$ are not constant throughout the sample period.

TABLE 1

Pseudo-code to determine individual consumption of a commodity from a common source.

```
Begin_Period:
        Record time stamp t_0
        Read initial ON/OFF state vector S_1
        Read value of integrated (cumulated) total commodity      consumed at time t_0, denoted QT_0
        Initialize index variable j = 0
Loop:
    DONE = FALSE
        while NOT DONE
            if(StateChange OR PeriodEnd)
                increment index, j = j+1
                record new state S_{j+1}
                record time stamp t_j
                record total consumption at time t_j, QT_j
                compute incremental consumption q_j = QT_j-QT_{j-1}
                compute and record d_j = (t_j-t_{j-1})
                compute and record D_j = d_j·S_j
            end if
            if (PeriodEnd)
                DONE = TRUE
            end if
        end while
End_Period:
% Compute average consumption rates
        form matrix Q (eq. (7))
        form matrix X (eq. (8))
        compute pseudoinverse of X = (X'·X)^{-1}X'
        compute R=(X'·X)^{-1}X'·Q
```

TABLE 2

Pseudo-code for equations 12 and 13.

```
Begin_Period:
    Record time stamp t_0
    Read initial ON/OFF state vector S_1
    Read value of integrated (cumulated) total commodity    consumed at time t_0, denoted QT_0
    Initialize index variable j = 0
    Initialize (X'·X)_0 = M by M zero matrix
    Initialize (X'·Q)_0 = M by 1 zero vector
Loop:
    DONE = FALSE
        while NOT DONE
            if (StateChange OR PeriodEnd)
                increment index, j = j+1
                record new state S_{j+1}
                record time stamp t_j
                record total commodity at time t_j, QT_j
                compute incremental consumption q_j = QT_j-QT_{j-1}
                compute d_j = (t_j-t_{j-1})
                compute D_j = d_j·S_j
                Update matrices:
                    (X'·X)_j =(X'·X)_{j-1} + D'_j·D_j
                    (X'·Q)_j =(X'·Q)_{j-1} + D'_j·q_j
            end if
            if (PeriodEnd)
                DONE = TRUE
            end if
        end while
End_Period:
% Compute average consumption rates
    compute pseudoinverse of X = (X'·X)^{-1}X'
    compute R = (X'·X)^{-1}X'·Q
```

A typical implementation computes average consumption rates per day on an on-going basis. In such a case, the recorded data at the end of one time period become the initial values for the following period. The algorithms presented above provide estimates of the rate of consumption for each device in the example where the measure of the commodity is flow rate. To determine the total volume of commodity consumed by each user within the period, it is desirable to compute the total ON time for each individual user. This can be computed by a term-by-term addition of the state duration vectors $D_i$. Define the 1 by m vector H of user operating time totals:

$$H = \sum_{1}^{N} D_i \qquad \text{(Eq. 14)}$$

where N is the number of distinct user-states observed during the period of interest. The estimated total consumption per user, $Q_j$, j=0 . . . m, is computed as the term-by-term product of the estimated rate R and the accumulated operating time H. The pseudo-code algorithm provided in Table 3 performs this calculation.

TABLE 3

Total Consumption Calculation.

```
Begin_Period:
    Record time stamp t_0
    Initialize unit durations H = one by M zero vector
    Read initial ON/OFF state vector S_1
    Read value of integrated total commodity, denoted QT_0
    Initialize index variable j = 0
    Initialize (X'·X)_0 = M by M zero matrix
    Initialize (X'·Q)_0 = M by one zero vector
```

TABLE 3-continued

Total Consumption Calculation.

```
Loop:
    DONE = FALSE
        while NOT DONE
            if(StateChange OR PeriodEnd)
                increment index, j = j+1
                record new state S_{j+1}
                record time stamp t_j
                record total commodity at time t_j, QT_j
                compute incremental consumption q_j = QT_j-QT_{j-1}
                compute d_j = (t_j-t_{j-1})
                compute D_j = d_j·S_j
                update H = H + D_j
                Update matrices:
                    (X'·X)_j=(X'·X)_{j-1} + D'_j·D_j
                    (X'·Q)_j=(X'·Q)_{j-1} + D'_j·q_j
            end if
            if (PeriodEnd)
                DONE = TRUE
            end if
        end while
End_Period:
    % Compute average consumption rates
    compute pseudoinverse X = (X'·X)^{-1}X'·Q
    compute R = (X'·X)^{-1}X'·Q
    % Compute total consumption per unit
    for i = 1 to M
        Q*_i = H(i)*R(i)
    next I
```

In another example, devices and methods in accordance with the present invention are applicable to electrical loads, where the commodity is electrical energy.

Electrical energy is often measured in kilowatt-hours, and consuming devices (users) can be any type of electric power consuming device, such as motors, furnaces, heaters, lighting, or other electric power consuming device.

In a further example, mechanical power and energy consumption is determined in a mechanical device having multiple power take-offs (users) from a common drive shaft system. The measuring/metering function is performed by measuring shaft speed and torque, and multiplying them to get power, then integrating the result to obtain mechanical energy. Alternatively, fuel-flow to a drive engine is used to determine input power, and methods and devices in accordance with the present invention can be used to determine the amount of fuel consumption attributable to each power-consuming user. One use is to apportion fuel costs accordingly. Similarly to above, constant losses such as friction of the drive system are accounted for by a fictitious device #0.

Methods and devices in accordance with embodiments of the present invention are used to determine the amount of pneumatic usage by multiple users from a single air supply. Power, in this case, is determined by the product of pressure and flow-rate, integrable to determine pneumatic energy supplied. Alternately, the power and/or energy delivered to a compressor is used as a measure of the source commodity. Hydraulic systems can be addressed similarly to pneumatic.

Each feature disclosed in this specification (including any accompanying claims, abstract, and drawings), is replaceable by alternative features having the same, equivalent or similar purpose, unless expressly stated otherwise. Thus, unless expressly stated otherwise, each feature disclosed is one example only of a generic series of equivalent or similar features.

While preferred embodiments of the present invention have been shown and described herein, it will be obvious to those skilled in the art that such embodiments are provided by way of example only. Numerous variations, changes, and substitutions will be apparent to those skilled in the art without departing from the invention. Accordingly, it is intended that the invention be limited only by the scope of the appended claims.

What is claimed is:

1. A method for tracking individual commodity-user consumption of a commodity delivered from a common source to two or more commodity-users, comprising:
    determining an amount of the commodity drawn from the common source by the two or more commodity users;
    determining a commodity-user-state that indicates use of the commodity by each of at least two commodity-users; and
    reporting an individual commodity-user consumption of the commodity for said each of the at least two commodity-users, as a function of repeated determinations of the amount of the commodity drawn from the common source and the commodity-user-state, for a number of repetitions greater than or equal to the number of commodity-users.

2. The method of claim 1, comprising performing a minimum least square estimate on the repeated determinations of the amount of the commodity drawn from the common source and the commodity-user-state information to produce an estimate of each commodity-user's rate of consumption.

3. The method of claim 1, comprising performing a singular value decomposition on the repeated determinations of the amount of the commodity drawn from the common source and the commodity-user-state information to produce an estimate of each commodity-user's rate of consumption.

4. The method of claim 1, comprising performing a discriminant function analysis of the determined amount of delivery and commodity-user-state information to produce an estimate of each commodity-user's rate of consumption.

5. The method of claim 1, comprising performing a canonical correlation analysis of the determined amount of delivery and commodity-user-state information to produce an estimate of each commodity-user's rate of consumption.

6. The method of claim 1, comprising performing a linear regression canonical analysis of the determined amount of delivery and commodity-user-state information to produce an estimate of each commodity-user's rate of consumption.

7. The method of claim 1, comprising:
    measuring a time-period during which a particular commodity-user draws from the common source, using the commodity-user-state information; and
    calculating the total amount of the commodity consumed by the particular commodity-user using the time-period and determined amount of consumption of the particular commodity-user.

8. The method of claim 1, wherein the commodity comprises gas.

9. The method of claim 1, wherein the commodity comprises electricity.

10. The method of claim 1, wherein the commodity comprises mechanical energy.

11. The method of claim 1, wherein the commodity comprises pneumatic energy.

12. The method of claim 1, wherein the commodity comprises hydraulic energy.

13. The method of claim 1, wherein the commodity comprises water.

14. A device for determining an individual commodity-user consumption of a commodity delivered from a common source to two or more commodity-users, comprising:
    a commodity-user-state that indicates use of the commodity by each of at least two commodity-users;
    a meter configured to measure an amount of the commodity drawn from the common source by the two or more commodity-users; and
    a processor coupled to the meter, the processor configured to determine an individual commodity-user consumption of the commodity for said each of at least two commodity-users, as a function of repeated determinations of the amount of the commodity drawn from the common source and the commodity-user-state, for a number of repetitions greater than or equal to the number of commodity-users.

15. The device of claim 14, wherein the processor is further configured to solve a set of equations developed using the meter and commodity-user state information to determine the rate of consumption of the commodity for each of the plurality of commodity-users.

16. The device of claim 14, comprising a memory configured to store the meter and commodity-user state information, wherein the processor is configured to develop a set of equations using the stored meter and commodity-user-state information.

17. The device of claim 14, wherein the commodity comprises gas.

18. The device of claim 14, wherein the commodity comprises electricity.

19. The device of claim 14, wherein the commodity comprises mechanical energy.

20. The device of claim 14, wherein the commodity comprises pneumatic energy.

21. The device of claim 14, wherein the commodity comprises hydraulic energy.

22. The device of claim 14, wherein the commodity comprises water.

23. A device for determining an individual commodity-user consumption of a commodity delivered from a common source to two or more commodity-users, comprising:

means for determining the amount of the commodity drawn from the common source;

means for determining a commodity-user-state that indicates use of the commodity by each of at least two commodity-users; and means for reporting the individual commodity-user consumption of the commodity for said each of the at least two commodity-users, as a function of repeated determinations of the amount of the commodity drawn from the common source and the commodity-user-state, for a number of repetitions greater than or equal to the number of commodity-users.

* * * * *